(12) United States Patent
Smith et al.

(10) Patent No.: US 7,962,725 B2
(45) Date of Patent: Jun. 14, 2011

(54) PRE-DECODING VARIABLE LENGTH INSTRUCTIONS

(75) Inventors: Rodney Wayne Smith, Raleigh, NC (US); Brian Michael Stempel, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 6 days.

(21) Appl. No.: 11/381,545

(22) Filed: May 4, 2006

(65) Prior Publication Data

US 2007/0260854 A1    Nov. 8, 2007

(51) Int. Cl.
  *G06F 9/30* (2006.01)
  *G06F 9/40* (2006.01)
  *G06F 7/38* (2006.01)
  *G06F 9/00* (2006.01)
  *G06F 9/44* (2006.01)

(52) U.S. Cl. .................. 712/213; 712/210; 712/227

(58) Field of Classification Search .................. 712/213, 712/210, 227
  See application file for complete search history.

(56) References Cited

U.S. PATENT DOCUMENTS

| | | | |
|---|---|---|---|
| 5,717,587 A | 2/1998 | Black et al. | |
| 6,269,384 B1 | 7/2001 | Oberman | |
| 6,968,430 B1 * | 11/2005 | Kashyap | 711/137 |
| 2003/0163670 A1 * | 8/2003 | Augsburg et al. | 712/209 |
| 2003/0182535 A1 * | 9/2003 | Kadowaki | 712/207 |
| 2004/0133764 A1 * | 7/2004 | O'Connor et al. | 712/43 |
| 2005/0262329 A1 * | 11/2005 | Krishnan et al. | 712/210 |

FOREIGN PATENT DOCUMENTS

| | | |
|---|---|---|
| CN | 1522410 | 8/2004 |
| KR | 1020010050792 | 6/2001 |
| RU | 2181929 | 4/2002 |

OTHER PUBLICATIONS

Ashok Halambi et al.; A Design Space Exploration Framework for Reduced Bit-width Instruction Set Architecture (rISA) Design; 15th International Symposium on System Synthesis. ISSS. Kyoto, Japan; Oct. 2-4, 2002; New York, NY; Oct. 2, 2002; pp. 120-125.
Kenji Minagawa et a.; Pre-decoding Mechanism for Superscalar Architecture; Communications, Computers and Signal Processing, 1991., IEEE Pacific Rim Conference in Canada, May 9-10, 1991; New York, May 9, 1991; pp. 21-24.
International Search Report and Written Opinion—PCT/US07/067057, International Search Authority—European Patent Office—Aug. 30, 2007.

* cited by examiner

*Primary Examiner* — Eddie P Chan
*Assistant Examiner* — George D Giroux
(74) *Attorney, Agent, or Firm* — Peter M. Kamarchik; Nicholas J. Pauley; Jonathan T. Velasco

(57) ABSTRACT

A pre-decoder in a variable instruction length processor indicates properties of instructions in pre-decode bits stored in an instruction cache with the instructions. When all the encodings of pre-decode bits associate with one length instruction are defined, a property of an instruction of that length may be indicated by altering the instruction to emulate an instruction of a different length, and encoding the property in the pre-decode bits associated with instructions of the different length. One example of a property that may be so indicated is an undefined instruction.

18 Claims, 4 Drawing Sheets

PRE-DECODING VARIABLE LENGTH INSTRUCTIONS

FIELD

The present disclosure relates generally to the field of processors and in particular to a method of pre-decoding variable length instructions, such as to identify undefined instructions.

BACKGROUND

Variable length instruction set architectures are known in the art. For example, when the Thumb (16-bit) extensions are added to the ARM (32-bit) instruction set, the resulting mix may be considered a variable length instruction set. As another example, executable Java code comprises a series of bytecodes, with each instruction ranging between 2 and 256 bytes in length. In general, variable length instruction sets comprise instructions of a base size, and longer instructions that are an integral multiple of the base size.

Processor architectures and instruction sets evolve over time. In particular, as semiconductor technology advances, functionality may be rendered in hardware that formerly required an extensive software routine to accomplish. To efficiently exploit the advanced hardware structures, new instructions are added to the instruction set. However, one feature of stable processor architectures is backward compatibility. That is, software written for a processor architecture should be executable on an older processor that conforms to the architecture, even if it does not implement the most recent functionality or directly execute the most recent instructions. Accordingly, common processor architectures include an "undefined" instruction which generates an exception, and the function associated with the undefined instruction is executed in software.

One common approach taken by conventional high-performance processors to optimize instruction decoding is pre-decoding. A pre-decoder is a logic circuit that inspects and partially decodes instructions fetched from memory prior to storing the instructions in an instruction cache (I-cache). The pre-decoder generates a small number of pre-decode bits that are stored along with each instruction in the I-cache. Upon fetching instructions from the cache, the pipeline decoder may utilize the pre-decode bits to simplify the instruction decoding task. Pre-decode bits may, for example, identify branch instructions, identify the length of an instruction in a variable length instruction architecture, or the like. Pre-decode bits may also be utilized to identify undefined instructions.

In a variable length instruction set processor that implements pre-decoding, a small number of pre-decode bits may be associated with the shortest, or base, instruction length. A known instruction cache implementation is to associate this number of pre-decode bits with each I-cache storage location (each of which corresponds to the base instruction length). Longer instructions, occupying an integral multiple of I-cache storage locations, are correspondingly associated with a larger number of pre-decode bits. The number of discrete properties that can be encoded into the pre-decode bits associated with an instruction is thus a minimum for the base instruction length. If all of the available pre-decode bit encodings of the base instruction length are otherwise defined, utilizing the pre-decode bits to identify an undefined base length instruction would require increasing the number of pre-decode bits associated with the base instruction length. This technique would in turn increase the number of pre-decode bits stored along with every storage location in the I-cache. Since undefined instructions are rarely encountered, and instructions longer than the base length have a rich pre-decode bit encoding space, adding pre-decode bits to identify undefined base length instructions can waste expensive I-cache storage space.

SUMMARY

According to one or more embodiments described herein, a pre-decoder may indicate a property of an instruction when the pre-decode bit encoding space associated with that instruction length is fully defined. By altering the instruction to emulate an instruction of a different length, the pre-decoder may utilize an available encoding of the pre-decode bits associated with the different length instruction to indicate the property.

One embodiment relates to a method of pre-decoding an instruction in a processor. A property of a first instruction is identified. The first instruction is altered to emulate a second instruction. Pre-decode bits for the second instruction are generated that identify the property of the first instruction.

Another embodiment relates to a processor operative to read instructions from memory. The processor includes an instruction cache memory storing instructions read from memory and pre-decode bits associated with each instruction. The processor also includes a pre-decoder interposed between the memory and the instruction cache, the pre-decoder operative to identify a property of a first instruction; alter the first instruction to emulate a second instruction; generate pre-decode bits for the second instruction that identify the property of the first instruction; and write the pre-decode bits for the second instruction to the instruction cache.

DETAILED DESCRIPTION

Figure 1:
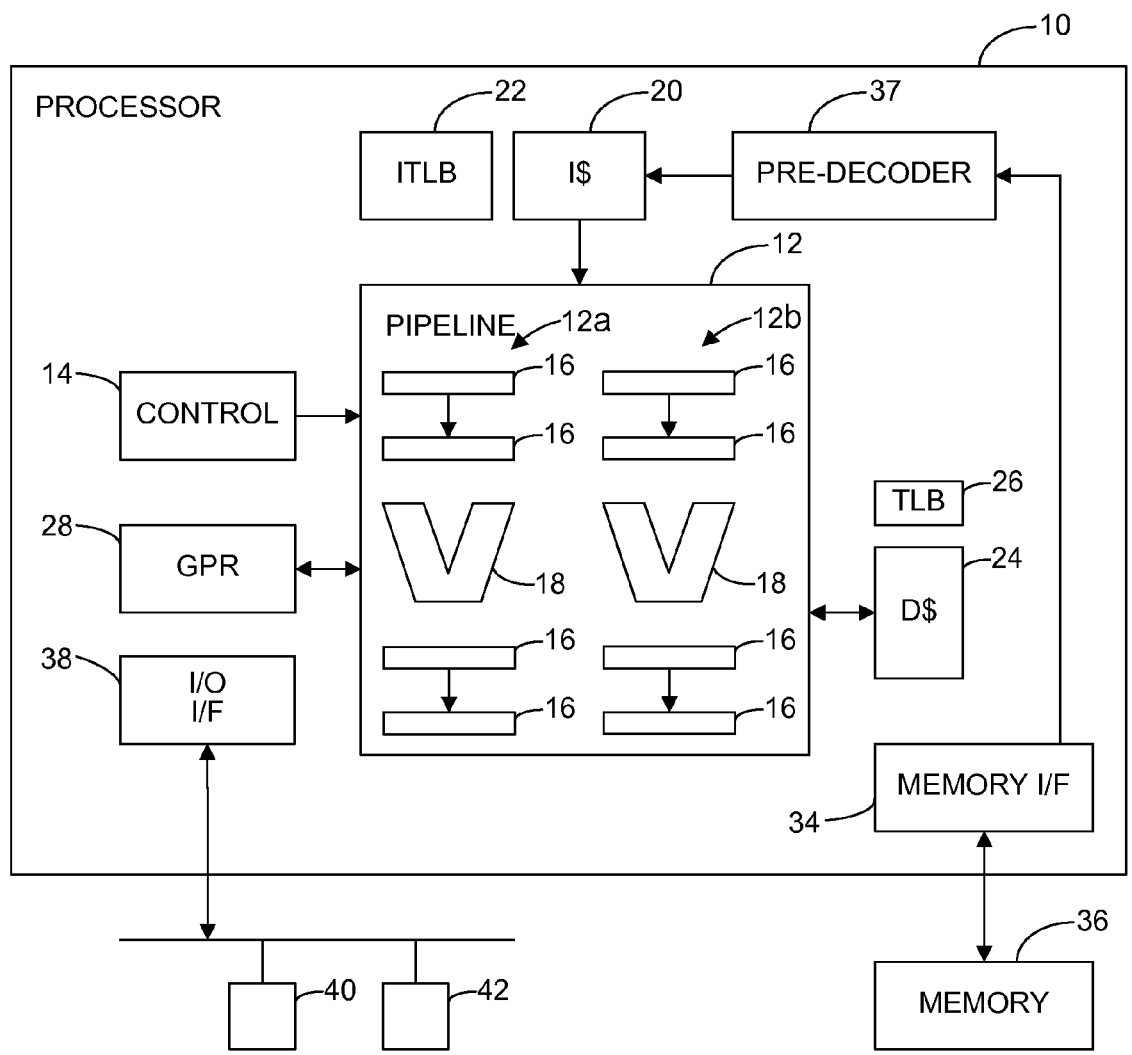
FIG. 1 is a functional block diagram of a processor.

FIG. 1 is a functional block diagram of a processor 10. The processor 10 executes instructions in an instruction execution pipeline 12 according to control logic 14. The pipeline 12 may be a superscalar design, with multiple parallel pipelines such as 12*a* and 12*b*. Each pipeline 12*a*, 12*b* includes various registers or latches 16, organized in pipe stages, and one or more Arithmetic Logic Units (ALU) 18. Pipe stage registers or latches 16 and ALUs 18 may read operands from and/or write results to registers in a General Purpose Register file 28.

The pipelines 12*a*, 12*b* fetch instructions from an Instruction Cache (I-Cache or I$) 20, with memory addressing and permissions managed by an Instruction-side Translation Lookaside Buffer (ITLB) 22. Data is accessed from a Data Cache (D-Cache or D$) 24, with memory addressing and permissions managed by a main Translation Lookaside Buffer (TLB) 26. In various embodiments, the ITLB 22 may comprise a copy of a portion of the TLB 26. Alternatively, the ITLB 22 and TLB 26 may be integrated. Similarly, in various embodiments of the processor 10, the I-cache 20 and D-cache 24 may be integrated, or unified. Misses in the I-cache 20 and/or the D-cache 24 cause an access to main (off-chip) memory 36, under the control of a memory interface 34.

Instructions fetched from memory are processed in a pre-decoder circuit 37 prior to being stored in the I-Cache 20. The pre-decoder 37 partially decodes the instructions, and appends pre-decode bits, which are stored along with the instructions in the I-Cache 20. When instructions are fetched from the I-Cache 20, the pre-decode bits provide information about each instruction that may be used by Decode pipe stages within pipelines 12a and 12b to more quickly and/or more efficiently decode the instruction. For example, pre-decode bits may identify the length of an instruction in a variable length instruction set architecture, identify branch instructions, and the like.

The processor 10 may include an Input/Output (I/O) interface 38, controlling access to various peripheral devices 40, 42. Those of skill in the art will recognize that numerous variations of the processor 10 are possible. For example, the processor 10 may include a second-level (L2) cache for either or both the I and D caches. In addition, one or more of the functional blocks depicted in the processor 10 may be omitted from a particular embodiment.

Figure 2:
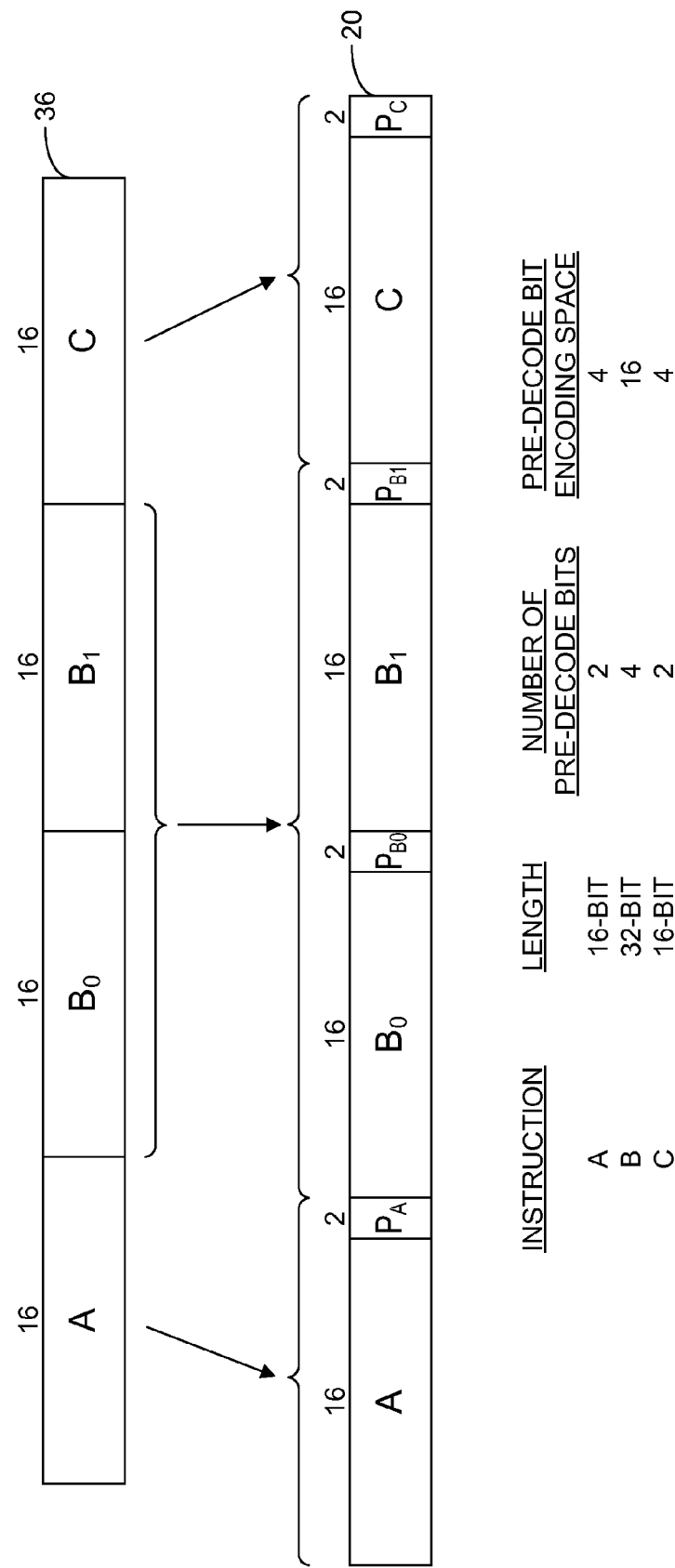
FIG. 2 is a functional block diagram depicting mapping variable length instructions from memory to the instruction cache.

FIG. 2 is a functional block diagram depicting the mapping of instructions from memory 36 into a line in the I-cache 20, through the pre-decoder 37, for one illustrative and non-limiting implementation. Instruction A is a 16-bit instruction (the base instruction length for this example). Upon instruction A being fetched from memory, the pre-decoder 37 appends two pre-decode bits $P_A$, which are stored along with the instruction A in the I-cache 20. Instruction B is a 32-bit instruction, stored in memory 36 as $B_0$ and $B_1$. The pre-decoder 37 appends four pre-decode bits, stored in the I-cache 20 as $P_{B0}$ and $P_{B1}$. Instruction C is a 16-bit instruction, and is stored in the I-cache 20 along with two pre-decode bits $P_C$.

As indicated by the table of FIG. 2, instructions A and C, having two pre-decode bits each, have a pre-decode bit encoding space of four. That is, four discrete properties—such as instruction length, whether the instruction is a branch, or the like—may be encoded into the pre-decode bits for instructions A and C. Instruction B, having a four pre-decode bits, has a pre-decode bit encoding space of 16. If supported by the architecture, a 48-bit instruction would have six pre-decode bits, for an encoding space of 64, and so on.

Assuming that, in a given implementation, all four of the pre-decode bit encodings for 16-bit instructions such as A and C are defined, an additional pre-decode bit may be added to each 16-bit storage location in the I-cache 20 to utilize the pre-decode bits to indicate an undefined 16-bit instruction. This would result in every storage location in the I-cache 20 having three associated pre-decode bits. 16-bit instructions would then have a pre-decode encoding space of eight—only five of which would be utilized. Additionally, 32-bit instructions would have a pre-decode encoding space of 64; 48-bit instructions would have a pre-decode encoding space of 512. Since this is far in excess of the number of discrete properties about instructions that the pre-decoder can indicate, increasing the number of pre-decode bits for the 16-bit instruction length result in a large waste of expensive I-cache 20 storage.

Figure 3:
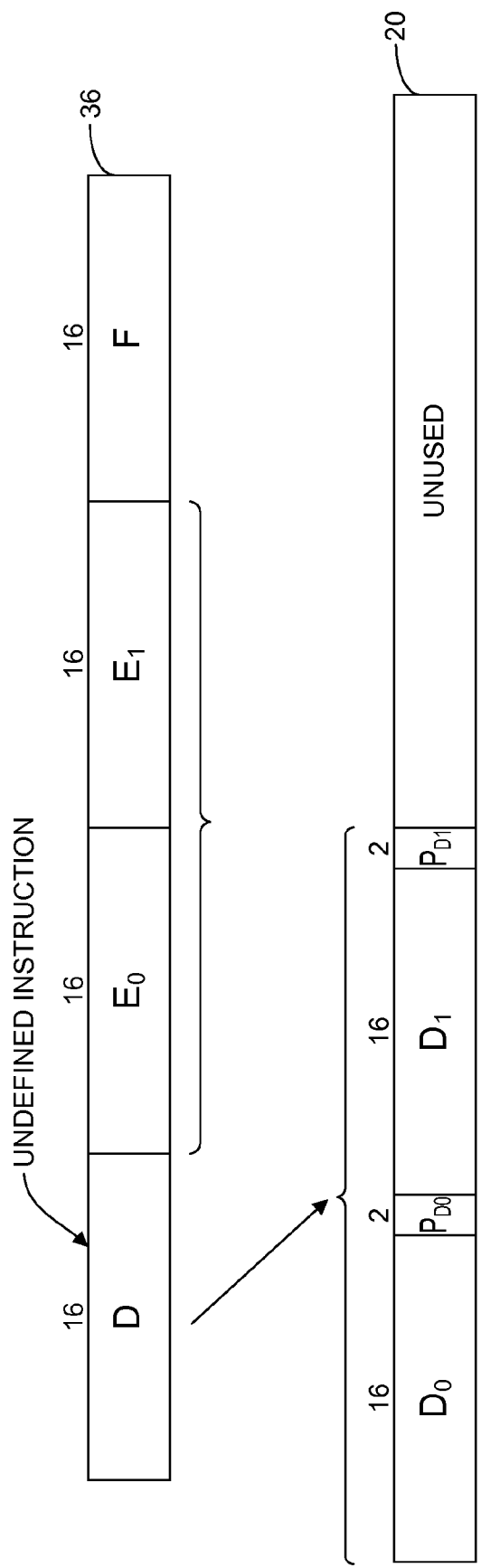
FIG. 3 is a functional block diagram depicting mapping an undefined instruction from memory to the instruction cache.

According to one embodiment, an undefined 16-bit instruction in this example may be altered to emulate a 32-bit instruction. The property that the instruction is in fact a 16-bit undefined instruction is encoded into one of the 16 pre-decode encodings associated with 32-bit instructions. In FIG. 3, instruction D is a 16-bit undefined instruction. Upon writing instruction D to the I-cache 20, it is altered to emulate a 32-bit instruction, comprising $D_0$ and $D_1$. Pre-decode bits $P_{D0}$ and $P_{D1}$ are written, indicating that instruction D is actually a 16-bit undefined instruction.

In one embodiment, where only the fact of a 16-bit undefined instruction is required by the pipeline 12, the pre-decoder 37 may write only the pre-decode bits $P_{D0}$ and $P_{D1}$ to the I-cache 20, discarding the instruction D. In another embodiment, such as where data within the bit field of the instruction is common or helpful to vector the software trap, the instruction D may be written to either of $D_0$ or $D_1$, or both, as well as the pre-decode bits $P_{D0}$ and $P_{D1}$ being written to the I-cache 20. In still another embodiment, the pre-decoder 37 may write the instruction D to one of $D_0$ or $D_1$, and may write additional information to the other 16-bit I-cache 20 storage location, as well as writing the pre-decode bits $P_{D0}$ and $P_{D1}$. In any event, it is the pre-decode bits $P_{D0}$ and $P_{D1}$ that both emulate a 32-bit instruction (so that all the pre-decode bits are read) and indicates that the instruction is actually a 16-bit undefined instruction. In this manner, the pre-decoder 37 can indicate a base size undefined instruction without expanding the pre-decode bits associated with base size instructions, hence avoiding inefficient memory utilization.

In the embodiment depicted in FIG. 3, neither instruction E nor F is pre-decoded or loaded into the I-cache 20. Since the effective length of an instruction in the line has been altered between the memory 36 and the I-cache 20, the remainder of the cache line cannot contain all of the remaining instructions in the corresponding memory spaces (e.g., both E and F). The pre-decoder 37 may mark the remainder of the cache line as unused or invalid, or may simply insert invalid or undefined pre-decode bits in the appropriate bit positions. In normal execution, the processor will trap to software upon encountering the undefined instruction, and the cache line will likely be replaced. Utilizing a software exception handler to handle the trap caused by the undefined instruction allows software to emulate instructions which were not contemplated at the time a processor, such as processor 10, is fixed in silicon or other semiconductor material. If other code happens to branch into the cache line, it will encounter an incorrect pre-decode and/or not recognize an expected instruction, causing the cache line to reload, or possibly causing an exception. Since undefined instructions are assumed to be rarely encountered, the performance impact of a corrupted I-cache line due to the altered undefined instruction emulating an instruction of a different length is not of great concern.

The method disclosed herein is not limited to an undefined instruction of the base instruction length, as described above. In general, for any instruction property that may commonly be indicated via pre-decode bits but where the pre-decode bit encoding space for the associated instruction length is fully defined, the property may be indicated by altering the instruction to emulate an instruction of a different length, and utilizing an available pre-decode bit encoding of the different length instructions. For example, assume that all 16 encodings of the four pre-decode bits associated with 32-bit instructions in the previous example are defined, but only three or fewer of the four encodings of the two pre-decode bits associated with 16-bit instructions are defined. In this case, a particular property of a 32-bit instruction not defined in the 32-bit instruction pre-decode bits may be indicated by altering the 32-bit instruction to emulate a 16-bit instruction, and encoding the relevant property in an available pre-decode bit encoding of the two pre-decode bits associated with 16-bit instructions. In this case, half of the 32-bit instruction bit field is lost, so the property being encoded is preferably one that does not depend on the instruction bit field (such as the fact that the instruction is undefined, although this is not the only property that may be so indicated).

Figure 4:
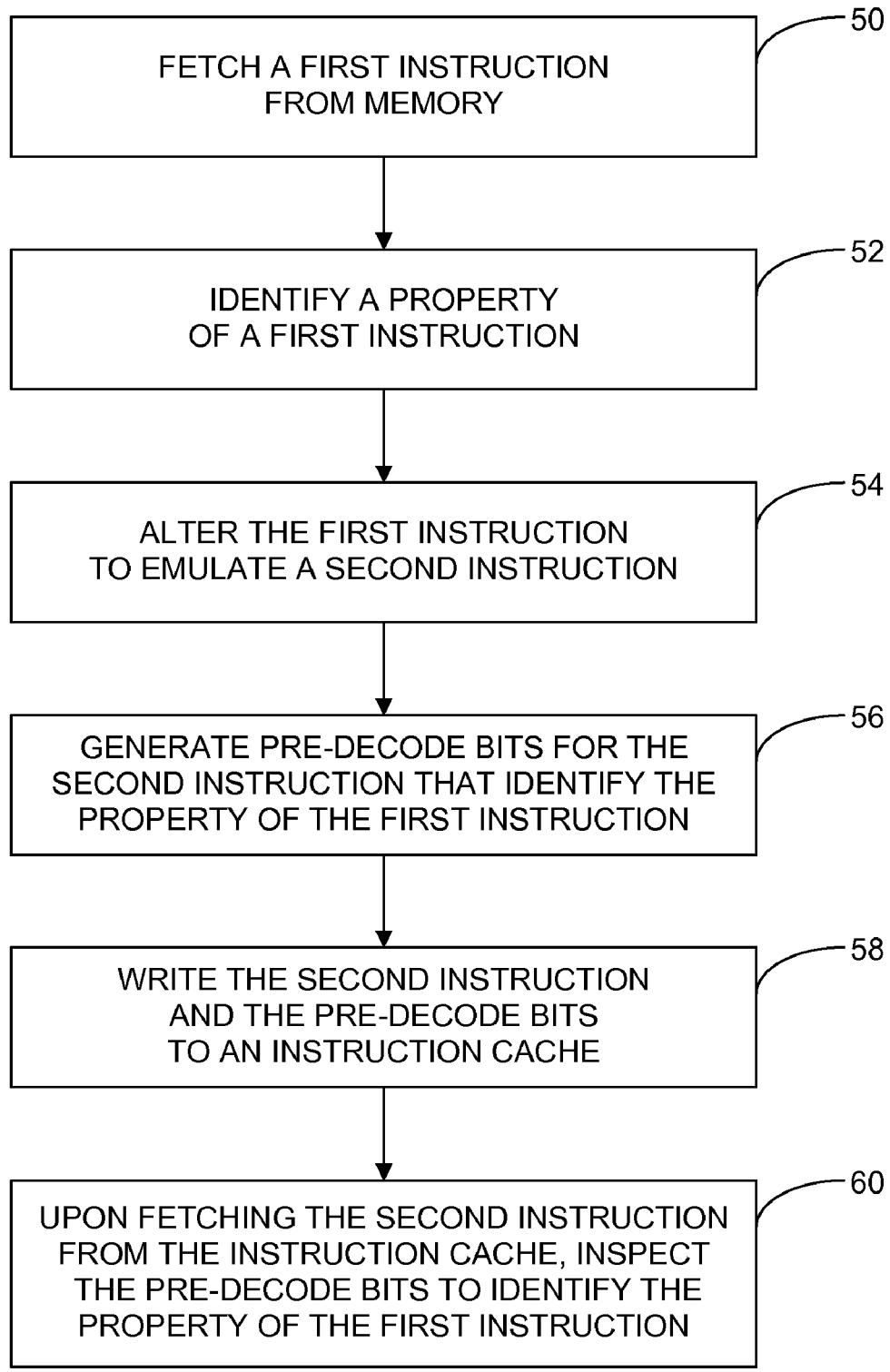
FIG. 4 depicts a method of pre-decoding an instruction, according to one embodiment.

FIG. 4 depicts a method of pre-decoding an instruction, according to one embodiment. Upon a miss in the I-cache 20, the memory interface 34 fetches at least a first instruction from the memory 36 (block 50). The pre-decoder 37 inspects the first instruction and identifies a property of the first instruction (block 52), such as that the first instruction is undefined. The pre-decoder 37 alters the first instruction to emulate a second instruction (block 54), such as a second instruction of a different length. The pre-decoder 37 additionally generates pre-decode bits for the second instruction that identify the property of the first instruction (block 56). That is, one of the available encodings of the pre-decode bits associated with the second instruction length is allocated to the relevant property of the first instruction. The pre-decoder 37 writes the second instruction and the associated pre-decode bits to the I-cache 20 (block 58). When the pipeline 12 fetches the second instruction and its pre-decode bits from the I-cache 20, logic in a Decode pipe stage inspects the pre-decode bits to identify the property of the first instruction (block 60), such as the fact that the first instruction is undefined. The pipeline 12 then takes appropriate action, such as for example causing an exception to handle the undefined instruction in software.

According to one or more embodiments described herein, a pre-decoder 37 may indicate a property of an instruction when the pre-decode bit encoding space associated with that instruction length is fully defined. By altering the instruction to emulate an instruction of a different length, the pre-decoder 37 may utilize an available encoding of the pre-decode bits associated with the different length instruction to indicate the property. When a property of a shorter instruction is indicated in the pre-decode bit encodings of a longer instruction, one or more instructions or fractions of an instruction will be displaced from the I-cache line. When a property of a longer instruction is indicated in the pre-decode bit encodings of a shorter instruction, some of the instruction bit field is lost. Accordingly, the instruction property indication technique disclosed herein is commonly employed to indicate exception-causing instruction properties, such as the fact of that an instruction is undefined, although it is not limited to such cases.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of pre-decoding an instruction in a processor, comprising:
   identifying a property of a first instruction wherein the property is different from other properties encoded in a first set of pre-decode bits for which all available encodings are defined or reserved;
   encoding the first instruction in a second format having a different length than a first format including a first instruction portion and the first set of pre-decode bits, the second format including a second instruction portion and a second set of pre-decode bits for which all available encodings of the second set of pre-decode bits are not defined or reserved;
   encoding the second set of pre-decode bits using one of the available encodings not defined or reserved in the second set of pre-decode bits to identify the property of the first instruction; and
   writing to a storage location the first instruction encoded in the second format including the encoded second set of pre-decode bits instead of the first instruction encoded in the first format wherein the first instruction in the second format, when fetched for execution, will cause an exception; and wherein the first instruction is undefined.

2. The method of claim 1 wherein the processor's instruction set is a variable length instruction set, and wherein instructions of the first format and instructions of the second format may be stored adjacent to each other within the storage location.

3. The method of claim 1 wherein the length of the storage location changes in response to writing the first instruction encoded in the second format.

4. The method of claim 1 wherein the first format is longer than the second format.

5. The method of claim 1 wherein the second format is longer than the first format.

6. The method of claim 1 wherein the first format has 18-bits comprising a 16-bit instruction portion and two pre-decode bits associated with it.

7. The method of claim 6 wherein the second format has 36-bits comprising a 32-bit instruction portion and four pre-decode bits associated with it.

8. The method of claim 7 wherein one of the sixteen encodings of the pre-decode bits associated with 32-bit instructions identifies an associated 32-bit instruction as a 16-bit undefined instruction.

9. The method of claim 1 further comprises:
   discarding the first instruction portion, wherein the first instruction encoded in the second format comprises the encoded second set of pre-decode bits.

10. The method of claim 1 wherein the first instruction encoded in the second format comprises the first instruction portion, the encoded second set of pre-decode bits, and additional information.

11. A processor operative to read instructions from memory, comprising:
   a pre-decoder interposed between a memory and an instruction cache, the pre-decoder operative to:
   identify a property of a first instruction read from the memory, wherein the property is different from other properties encoded in a first set of pre-decode bits for which all available encodings are defined or reserved;
   encode the first instruction in a second format having a different length than first format including a first instruction portion and the first set of pre-decode bits, the second format including a second instruction portion and a second set of pre-decode bits for which all available encodings of the second set of pre-decode bits are not defined or reserved;
   encode the second set of pre-decode bits using one of the available encodings not defined or reserved in the second set of pre-decode bits to identify the property of the first instruction; and
   write the first instruction encoded in the second format including the encoded second set of pre-decode bits to the instruction cache wherein the first instruction in the second format, when fetched for execution, will cause an exception; and wherein the first instruction is undefined.

12. The processor of claim 11 wherein the instructions read from memory are from a variable length instruction set.

13. The processor of claim 12 wherein the instruction cache comprises a plurality of instruction storage locations corresponding to the length of the shortest instruction, and wherein a predetermined number of pre-decode bits are associated with each storage location.

14. The processor of claim 13 wherein the instruction cache stores instructions longer than the shortest instruction in an integer multiple of storage locations, and associates with each instruction the pre-decode bits associated with each storage location.

15. The processor of claim 11 wherein the first format has 18-bits comprising a 16-bit instruction portion and two pre-decode bits associated with it.

16. The processor of claim 11 wherein the second format has 36-bits comprising a 32-bit instruction portion and four pre-decode bits associated with it.

17. The processor of claim 16 wherein one of the sixteen encodings of the pre-decode bits associated with 32-bit instructions identifies an associated 32-bit instruction as a 16-bit undefined instruction.

18. A method of executing an instruction in a processor, comprising:
    fetching from a cache a first instruction having a first format including a first instruction portion and a first set of pre-decode bits;
    identifying the fetched instruction as having a property of a second instruction having a different length format than the first format, the property identified from the first set of pre-decode bits; and
    executing the fetched first instruction based on the property of the second instruction wherein the first instruction is an encoding of the second instruction; wherein the first instruction in the first format, when fetched for execution, will cause an exception;
    and wherein the second instruction is undefined.

* * * * *